US008679628B2

(12) United States Patent
Honda et al.

(10) Patent No.: US 8,679,628 B2
(45) Date of Patent: Mar. 25, 2014

(54) INSULATED WIRE

(75) Inventors: Yuki Honda, Hitachi (JP); Tomiya Abe, Hitachi (JP); Hideyuki Kikuchi, Hitachi (JP); Daisuke Hino, Hitachi (JP)

(73) Assignees: Hitachi Cable, Ltd., Tokyo (JP); Hitachi Metals, Ltd., Tokyo (JP)

( * ) Notice: Subject to any disclaimer, the term of this patent is extended or adjusted under 35 U.S.C. 154(b) by 220 days.

(21) Appl. No.: 12/816,699

(22) Filed: Jun. 16, 2010

(65) Prior Publication Data

US 2010/0319961 A1 Dec. 23, 2010

(30) Foreign Application Priority Data

Jun. 18, 2009 (JP) ................................ 2009-144957
Jan. 26, 2010 (JP) ................................ 2010-014541

(51) Int. Cl.
*B32B 15/00* (2006.01)
*H01B 7/00* (2006.01)

(52) U.S. Cl.
USPC .................... 428/379; 174/120 SR; 428/373; 428/375; 428/376; 428/458; 428/473.5

(58) Field of Classification Search
USPC .......... 174/120; 428/373, 375, 376, 379, 458, 428/473.5
See application file for complete search history.

(56) References Cited

U.S. PATENT DOCUMENTS 4,258,155 A 3/1981 Holub et al.
5,030,408 A * 7/1991 Hirao et al. ............... 264/328.6
6,288,342 B1 9/2001 Ueoka et al.

FOREIGN PATENT DOCUMENTS

JP 58-34828 3/1983
JP 2000-235818 8/2000
JP 2001-155551 6/2001

* cited by examiner

*Primary Examiner* — Ana Woodward
(74) *Attorney, Agent, or Firm* — Antonelli, Terry, Stout & Kraus, LLP.

(57) ABSTRACT

There is provided an insulated wire equipped with an insulation film made of polymer alloy, the polymer alloy comprising an amorphous thermosetting resin and an amorphous thermoplastic resin, in which: the insulation film has a sea-island structure; the amorphous thermosetting resin is a sea component of the sea-island structure; and the amorphous thermoplastic resin is an island component of the sea-island structure.

10 Claims, No Drawings

INSULATED WIRE

CLAIM OF PRIORITY

The present application claims priority from Japanese patent applications: serial no. 2009-144957 filed on Jun. 18, 2009; and serial no. 2010-014541 filed on Jan. 26, 2010, the contents of which are hereby incorporated by reference into this application.

BACKGROUND OF THE INVENTION

1. Field of the Invention

The present invention relates to an insulated wire formed by applying an insulation film paint on a conductor and baking it. More particularly, the invention relates to an insulated wire preferably used for coils in electrical equipments such as rotary electric machines.

2. Description of Related Art

Usually, an insulated wire used for coils in rotary electric machines and transformers is constructed such that a single layer or a plurality of layers of insulation film is provided on the outer periphery of a conductor which is formed so as to have a cross-sectional shape (e.g. round or rectangle) to conform to the usage and shape of the coil. As rotary electric machines used in automobiles are required to generate higher output and to become compact and light-weight in recent years, insulated wires that enable high-density winding onto a core of a coil are required. Furthermore, for a coil created by welding the terminals of comparatively short insulated wires, insulated wires that will not be adversely affected as the result of being welded are required.

For an insulation film paint applicable to an insulation film for the insulated wire, JP-A Shou 58 (1983)-34828 (corresponding to WO 81/01568 and U.S. Pat. No. 4,258,155) discloses a resin composition formed by blending 5 to 95% by weight of polyamide-imide and 95 to 5% by weight of polyetherimide. According to JP-A Shou 58 (1983)-34828, a sheet formed by hardening the resin composition has mechanical characteristics equivalent to those of polyetherimide as well as chemical resistance and heat resistance properties equivalent to those of polyamide-imide.

Furthermore, JP-A 2000-235818 also discloses an insulated wire in which on a conductor there is formed an insulation layer made of a resin composition, e.g. polyamide-imide or the like, having the strength to adhere to the conductor of 30 g/mm or more and a glass transition temperature (Tg) of 250° C. or more; and thereon there is formed another insulation layer that is a mixture of a resin composition, e.g. polyamide-imide or the like, having Tg of 250° C. or more and another resin composition, e.g. polyetherimide, polyether sulfone or the like, having Tg of 140° C. or more, and whose breaking elongation is 40% or more. The insulated wire described in JP-A 2000-235818 seems to have an insulation film having excellent flexibility and processing resistance that will not cause cracks thereon even though the film is subject to a severe winding process or a severe rolling process, and the insulation film also seems to have heat resistance equivalent to that of polyamide-imide.

Furthermore, JP-A 2001-155551 discloses an insulated wire created such that on a conductor there is formed (a) a first insulation layer substantially composed of polyamide-imide and/or polyimide, and thereon there is formed and laminated (b) a second insulation layer formed by blending polyamide-imide A with thermoplastic resin B (polyetherimide, polyether sulfone or the like) having a glass transition temperature of 140° C. or more at a weight ratio A/B of 70/30 to 30/70, wherein: the ratio of thickness T1 of the first insulation layer to thickness T2 of the second insulation layer (T1/T2) is 5/95 to 40/60; and the amount of residual solvent is 0.05% by weight or less of the total amount of insulation film. The insulated wire described in JP-A 2001-155551 seems to have excellent processing resistance which will not cause damage to the film even if the film is subject to a severe rolling process or a severe winding process, also having high heat resistance equivalent to that of polyamide-imide, and further having excellent junction characteristics that prevent the foaming of the insulation film around the joint area due to heat during the process of joining the terminals of insulated wires as well as preventing the elongation of the discolored area.

Due to the recent requirements for smaller size, higher performance, and energy conservation of electric equipment, the application of inverter control in rotary electric machines is becoming more and more popular. Also, to meet the demand, inverter control is increasingly executed by a higher voltage and larger current (greater electric power). In that case, there is a problem in that high inverter surge voltage generated by inverter control adversely affects the insulation system of the coil in a rotary electric machine.

In order to prevent deterioration of the insulation film due to inverter surge voltage, it is necessary to suppress the generation of partial discharge in the insulation film, that is, it is necessary to make partial-discharge start voltage in the insulation film high. To do so, effective known methods are, for example, a method of increasing the thickness of the insulation film, and a method of decreasing the dielectric constant of the insulation film by the use of fluoric polyimide resin.

On the other hand, with the achievement of higher efficiency of electric equipment, improvement of the space factor of the insulated wire is further required. That is, a further increase in partial-discharge start voltage (partial-discharge start voltage of at least 900 Vp) is required without increasing the thickness of the insulation film (with a thickness of approximately 45 μm).

However, when forming an insulation film by the use of fluoric polyimide resin, there is a problem in that weak adhesion between the insulation film and a conductor is prone to cause peeling, resulting in the occurrence of insulation breakdown.

On the other hand, when a resin composition described in JP-A Shou 58 (1983)-34828 is used for the insulation film on an enameled wire, since the temperature at which the polyetherimide component softens is low, there is a problem in that if the wire is subject to a temporarily high temperature (e.g. rotary electric machine overload operating condition or the like), a short-circuit occurs. Furthermore, in the insulated wires disclosed in JP-A 2000-235818 and JP-A 2001-155551, there is a possibility that a malfunction may occur due to the temperature at which a polyetherimide component softens is low, and also the partial-discharge start voltage is not high enough.

SUMMARY OF THE INVENTION

Therefore, in view of the above problems, it is an objective of the present invention to provide an insulated wire equipped with an insulation film having mechanical characteristics and heat resistance properties equivalent to or better than those of the conventional insulation film and also having a higher partial-discharge start voltage. Furthermore, it is another objective of the present invention to provide an insulated wire having a thickness of insulation film equivalent to that of the conventional insulation film and also having a higher partial-discharge start voltage.

(1) According to one aspect of the present invention, there is provided an insulated wire equipped with an insulation film made of polymer alloy, the polymer alloy comprising an amorphous thermosetting resin and an amorphous thermoplastic resin, in which:

the insulation film has a sea-island structure; the amorphous thermosetting resin is a sea component of the sea-island structure; and the amorphous thermoplastic resin is an island component of the sea-island structure.

In the above aspect (1) of the invention, the following modifications and changes can be made.

(i) The average diameter of the island component is less than 1 μm.

(ii) The polymer alloy contains 10 parts by mass or more and 150 parts by mass or less of the amorphous thermoplastic resin with regard to 100 parts by mass of the amorphous thermosetting resin.

(iii) The average molecular mass in the amorphous thermosetting resin is 10,000 or more and 200,000 or less, and the average molecular mass in the amorphous thermoplastic resin is 15,000 or more and 200,000 or less.

(iv) The amorphous thermosetting resin is polyamide-imide, and the amorphous thermoplastic resin is polyetherimide.

(v) The thickness of the insulation film is 1 μm or more and 200 μm or less.

(2) According to another aspect of the present invention, there is provided an insulated wire equipped with an insulation film made of polymer alloy, the polymer alloy comprising amorphous thermoplastic resin and amorphous thermosetting resin, in which:

the amorphous thermosetting resin is a polyamide-imide resin having a repeat unit indicated by chemical formula 1, described below;

the insulation film has a sea-island structure; the amorphous thermosetting resin is a sea component of the sea-island structure; and the amorphous thermoplastic resin is an island component of the sea-island structure.

(vii) The polymer alloy contains 10 to 150 parts by mass of the amorphous thermoplastic resin with regard to 100 parts by mass of the polyamide-imide resin having a repeat unit indicated by the chemical formula 1.

(viii) The average diameter of the island component is less than 1 μm.

(ix) The amorphous thermoplastic resin is a polyetherimide resin.

(x) The thickness of the insulation film is 1 μm or more and 45 μm or less.

Advantages of the Invention

According to the present invention, it is possible to provide an insulated wire having mechanical characteristics and heat resistance equivalent to or better than those of the conventional insulation film as well as having a higher partial-discharge start voltage. Furthermore, it is possible to provide an insulated wire having a thickness equivalent to that of the conventional insulation film as well as having a higher partial-discharge start voltage. An insulated wire according to the present invention can suppress the generation of partial discharge in the insulation film and is suitable for an insulated wire for coils in an inverter-controlled electric equipment.

DETAILED DESCRIPTION OF THE PREFERRED EMBODIMENTS

In order to achieve the aforementioned objectives, the inventors of the present invention have studiously examined the microstructure (specifically, micro phase separation structure) of the insulation film, and have revealed that good characteristics can be obtained when the microstructure of the insulation film is a specific sea-island structure, thus, achieving the present invention. Hereafter, preferred embodiments of the present invention will be described. However, the present invention is not intended to be limited to the embodiments exhibited herein, and combinations and modifications can be made within the range in which the concept of the present invention is not altered.

[Chemical formula 1]

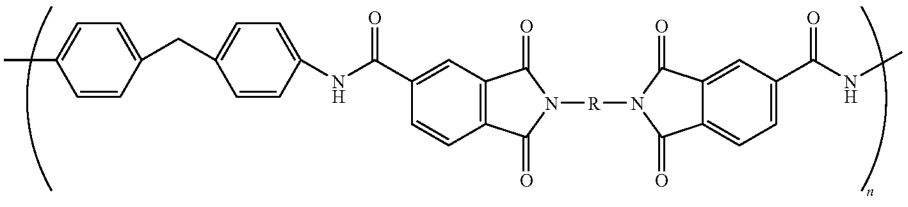

[In chemical formula 1, R denotes aromatic diamines having a bivalent aromatic group having three or more aromatic rings, and n denotes the number of repetitions and is a positive integer.]

In the above aspect (2) of the invention, the following modifications and changes can be made.

(vi) The polyamide-imide resin having a repeat unit indicated by the chemical formula 1 is a polyamide-imide resin obtained by reacting imide-group-containing dicarboxylic acid, which is created by synthetically reacting a diamine component composed of aromatic diamines having a bivalent aromatic group having three or more aromatic rings with an acid component by an azeotropic solvent, with a diisocyanate component composed of aromatic diisocyanates.

It is preferable that the microstructure (micro phase separation structure) of polymer alloy composing an insulation film according to the present invention be a sea-island structure. Furthermore, it is preferable that the sea component (continuous phase component) of the sea-island structure be an amorphous thermosetting resin and the island component (dispersing phase component) is an amorphous thermoplastic resin. In the case of the reverse configuration (when the sea component is an amorphous thermoplastic resin and the island component is an amorphous thermosetting resin), the structure is not preferable because the entire insulation film shows thermoplastic behaviors (softening temperature is low and heat resistance is poor). Also, when the micro phase separation structure of polymer alloy is a co-continuous structure (e.g. lamellae structure or gyroid structure), the structure is not preferable because the entire insulation film shows thermoplastic behaviors.

It is preferable that an average diameter of the amorphous thermoplastic resin, which is an island component of the sea-island structure, be less than 1 μm. When an average diameter of the island component is less than 1 μm, mechanical characteristics and heat resistance of the insulation film are significantly improved, and furthermore, appearance after the enamel baking process becomes good. On the contrary, when an average diameter of the island component is 1 μm or more, problematic phenomena occur in that mechanical characteristics deteriorate due to the occurrence of microcracks, thermoplastic behaviors appear due to the large island component, and appearance becomes unacceptable after the enamel baking process, thus, the situation is undesirable.

It is preferable that in a polymer alloy in the present invention, with regard to 100 parts by mass of amorphous thermosetting resin, the amount of the blended amorphous thermoplastic resin be 10 parts by mass or more and 150 parts by mass or less. If the blending quantity of the amorphous thermoplastic resin is too small, it becomes difficult to obtain an insulated wire having a high partial-discharge start voltage.

It is further preferable that with regard to 100 parts by mass of amorphous thermosetting resin, the blending quantity of the amorphous thermoplastic resin be 30 parts by mass or more and 130 parts by mass or less, and the blending quantity of the amorphous thermoplastic resin being 50 parts by mass or more and 120 parts by mass or less is most preferable. When the blending quantity of the amorphous thermoplastic resin is 50 parts by mass or more and 120 parts by mass or less, the balance between the dielectric constant and the heat resistance of the insulation film is the best.

On the other hand, with regard to 100 parts by mass of amorphous thermosetting resin, when 151 parts by mass through approximately 300 parts by mass of amorphous thermoplastic resin is contained in a polymer alloy, the thermosetting resin and the thermoplastic resin form a co-continuous phase separation structure, resulting in showing thermoplastic behaviors throughout the structure. For example, the elasticity coefficient significantly decreases at 250° C. or more, and heat resistance also significantly decreases, thus, the situation is undesirable.

Furthermore, with regard to 100 parts by mass of amorphous thermosetting resin, when a polymer alloy contains 300 parts by mass or more of amorphous thermoplastic resin, the thermosetting resin becomes an island component and the thermoplastic resin becomes a sea component thereby forming a sea-island structure. This structure is undesirable as well because throughout the structure thermoplastic behaviors are apparent.

A polymer alloy production method is not particularly limited as long as an insulation film which satisfies the requirements prescribed by the present invention can be obtained, and any usual method can be used. For example, there are some methods: a method of separately dissolving each resin in each solvent and then mixing the liquid solutions; a method of simultaneously dissolving and mixing resins in the same solvent; a method of dissolving a resin in a solvent, adding the other resin, and then dissolving and mixing those resins together; a method of dissolving a resin in a solvent, and then synthesizing and mixing the other resin in the solution; and the like. Moreover, in the present invention, it is particularly preferable that an amorphous thermosetting resin and an amorphous thermoplastic resin are used and a polar solvent is also used to improve the compatibility between the resins and the solvent on the polymer-alloy production stage so that an insulation film can easily form a sea-island structure.

An insulated wire production method is not particularly limited as long as an insulated wire that satisfies the requirements prescribed by the present invention can be obtained, and any usual enameled-wire production method can be used. For example, an insulated wire can be produced by applying a liquid solution (insulation film paint) of polymer alloy produced as described above onto a conductor and by baking it to form an insulation film. Moreover, when necessary, an insulated wire according to the present invention can be further equipped with a self-lubricating film on the outermost layer of the insulation film, and can be further equipped with a film between the conductor and the insulation film to increase adhesion properties. The self-lubricating film and the film for improving the adhesion properties can be formed, for example, by selecting, as a base resin, one or more resins from polyimide, polyamide-imide, polyester imide, H-type polyester, and the like.

It is preferable that average molecular mass of the amorphous thermosetting resin, which is a sea component of polymer alloy, be 10,000 to 200,000, and 15,000 to 100,000 is more preferable. If the average molecular mass of the thermosetting resin is smaller than 10,000, there are problems in which mechanical strength of the film decreases and the dielectric constant becomes high because the resin contains many molecule terminals. On the other hand, if the average molecular mass of the thermosetting resin is larger than 200,000, problems arise in that solubility to a solvent decreases, compatibility with thermoplastic resin decreases, and a sea portion of the sea-island structure cannot easily be formed.

Polyamide-imide or polyimide is preferably used as an amorphous thermosetting resin in the present invention. Moreover, a polyamide-imide production method is not particularly limited, and any known method can be applied. For example, there are some methods: a method of polymerizing a diisocyanate component and an acid component; a method of forming a reaction product by reacting a diamine component with an acid component, and further polymerizing the reaction product with an almost equimolar amount of diisocyanate component; a method of polymerizing an acid-chloride-containing acid component with a diamine component; and the like. To take a specific example, polyamide-imide obtained by reacting diphenylmethane diisocyanate with trimellitic anhydride can be preferably used.

Furthermore, it is particularly preferable that amorphous thermosetting resin in the present invention be a polyamide-imide resin having a repeat unit indicated by chemical formula 1 shown below.

[Chemical formula 1]

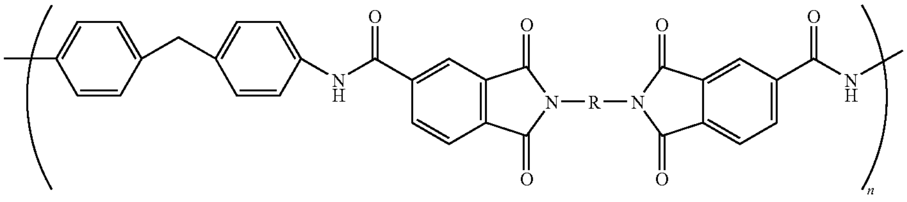

[In chemical formula 1, R denotes aromatic diamines having a bivalent aromatic group having three or more aromatic rings, and n denotes the number of repetitions and is a positive integer.]

On the premise that a polyamide-imide resin having a repeat unit indicated by the above chemical formula 1 is used as an amorphous thermosetting resin, and the polyamide-imide resin having a repeat unit indicated by the above chemical formula 1 is a sea component of the sea-island structure, and the amorphous thermoplastic resin is an island component, the insulation film can have a low specific dielectric constant (e.g. specific dielectric constant of less than 3.0). Therefore, even when a thickness (film thickness) of an insulation film formed on the periphery of the conductor is 45 μm or less, it is possible to provide an insulated wire having a high partial-discharge start voltage (e.g. partial-discharge start voltage of 1000 Vp or more).

Furthermore, for a polyamide-imide resin having a repeat unit indicated by the above chemical formula 1, it is preferable that a polyamide-imide resin be used which is obtained by reacting imide-group-containing dicarboxylic acid, wherein a diamine component composed of aromatic diamines having a bivalent aromatic group having three or more aromatic rings and an acid component are synthetically reacted by an azeotropic solvent, with a diisocyanate component composed of aromatic diisocyanate. By the use of the above polyamide-imide resin, it is possible to increase the average molecular mass of polyamide-imide resin without decreasing the heat resistance of the polyamide-imide resin, consequently, it is possible to effectively maintain the heat resistance as well as reduce the specific dielectric constant.

For a diamine component, aromatic diamines having a bivalent aromatic group having three or more aromatic rings are preferred, and for example: 2,2-bis[4-(4-aminophenoxy)phenyl]propane; bis[4-(4-aminophenoxy)phenyl]sulfone; bis[4-(4-aminophenoxy)phenyl]ether; 9,9-bis(4-aminophenyl)fluorene; 4,4'-bis(4-aminophenoxy)biphenyl; 1,4-bis(4-aminophenoxy)benzene; or their isomers can be exemplified. At least one of those can be selected.

Moreover, it is possible to replace a part of the above-exemplified diamine component with a diisocyanate component by the use of phosgene or the like. When using a diamine component a part of which has been replaced with a diisocyanate component, it is also possible to obtain polyamide-imide resin by mixing the diamine component with a diisocyanate component used for the reaction with imide-group-containing dicarboxylic acid and synthesizing the mixture.

For a diisocyanate component, aromatic diisocyanates are preferable, and aromatic diisocyanates, e.g.: 4,4'-diphenylmethane diisocyanate (MDI); 2,2-bis [4-(4-isocyanate phenoxy)phenyl]propane (BIPP); tolylene diisocyanate (TDI); naphthalene diisocyanate; xylylene diisocyanate; biphenyl-diisocyanate; diphenyl sulfone diisocyanate; diphenyl ether diisocyanate; and their isomers and multimeric complexes can be exemplified. At least one of those can be selected. Moreover, when necessary, aliphatic diisocyanates, e.g.: hexamethylene diisocyanate; isophorone diisocyanate; dicyclohexyl methane diisocyanate; and xylene diisocyanate, or alicyclic diisocyanates hydrogenerated with the aromatic diisocyanates exemplified above and their isomers can be used simultaneously. A compounding ratio of the diisocyanate component is not particularly limited, but it is preferable that the compounding ratio be such that the amount of imide-group-containing dicarboxylic acid obtained by the first-stage synthesis is equal to the amount of the diisocyanate component.

For an acid component, aromatic tricarboxylic anhydrides, e.g.: trimellitic anhydride; benzophenone tricarboxylic anhydride; and the like, can be used, and specifically, trimellitic anhydride is preferable.

Furthermore, at the synthesis of polyamide-imide resin, reaction catalysts, e.g.: amines; imidazoles; imidazolines; or the like, can be used within the range in which stability of the polyamide-imide resin is not inhibited. Furthermore, for the purpose of stopping the synthetic reaction of polyamide-imide resin, a sealant, e.g. alcohol, can be used.

For an azeotropic solvent used when reacting a diamine component with an acid component, aromatic hydrocarbon, e.g.: toluene; benzene; xylene; ethyl benzene; and the like, can be exemplified, and xylene is particularly preferable. Furthermore, it is preferable that reaction temperature during the reaction between the diamine component and the acid component be from 160 to 200° C., and 170 to 190° C. is more preferable. Moreover, reaction temperature during the reaction between imide-group-containing dicarboxylic acid and the diisocyanate component is from 110 to 130° C.

It is preferable that an amorphous thermoplastic resin, which is an island component of polymer alloy, be a thermoplastic resin having a low dielectric constant, and specifically, a thermoplastic resin having a specific dielectric constant of less than 3.3 is preferred. If a thermoplastic resin having a specific dielectric constant of 3.3 or more is used as an island component, it becomes difficult to make the specific dielectric constant of the entire insulation film low.

It is preferable that the average molecular mass of the amorphous thermoplastic resin be 15,000 to 200,000, and specifically, 20,000 to 100,000 is preferable. If the average molecular mass of thermoplastic resin is smaller than 15,000, there are problems in which mechanical strength of the film decreases and an island portion of the sea-island structure cannot easily be formed. On the other hand, if the average molecular mass of thermoplastic resin is larger than 200,000, problems arise in that solubility to a solvent decreases, and compatibility with thermosetting resin decreases.

In terms of the solubility to a solvent, heat resistance, and specific dielectric constant, polyetherimide resin is preferably used for amorphous thermoplastic resin in the present invention. Polyetherimide resin to be used is not particularly limited as long as it is polyether having two or more imide groups. A polyetherimide resin production method is not particularly limited, and any known method can be applied. To take a specific example, a polyetherimide resin obtained by condensating 4.4'[isopropylidene bis(P-phenyleneoxy)] diphthalic acid dihydrate with metaphenylene diamine can be preferably used.

For an amorphous thermoplastic resin in the present invention, commercially available polyetherimide resins (e.g. Ultem (registered trademark) made by SABIC Innovative Plastics) can be used. Furthermore, a polyetherimide resin can be a single composition or a composition made by mixing two or more compositions.

EXAMPLES

Hereafter, the present invention will be further described in detail based on the examples, however, the present invention is not intended to be limited to the examples.

Preparation of Example 1-1

Polyamide-imide (HI-406F29 made by Hitachi Chemical Company, Ltd., resin content of 29% by mass) and a 25% by mass polyetherimide solution in which polyetherimide (Ultem 1040A made by SABIC Innovative Plastics) were dissolved in N-methyl-2-pyrolidone and were blended together so that the mass ratio of each resin became 100/100, and the mixture was mixed and agitated in a flask. Next, N-methyl-2-pyrolidone was added to the mixed solution, and the mixed solution was further diluted until the mass concentration of nonvolatile substance became almost constant (27±2%) and the solution became a uniformly transparent brown, thereby producing an insulation film paint. Viscosity of the insulation film paint was 820 mPa·s. Subsequently, the insulation film paint was applied on the outer periphery of a copper-wire conductor having an outer diameter of 0.8 mm and was baked by a general enamel coating method, thereby producing an insulated wire (Example 1-1) having a 0.045-mm thick insulation film.

Moreover, with regard to the properties of the insulation film paint, appearance of the insulation film paint was visually inspected, and viscosity of the insulation film paint was measured at room temperature by the use of a cone-and-plate rotation viscometer (TV-20 made by Toki Sangyo Co., Ltd.). Furthermore, thickness of the insulation film was measured by inspecting the cross-section of the insulated wire produced by the use of a scanning electron microscope (S-3500N made by Hitachi, Ltd.).

Preparation of Example 1-2

An insulation film paint was produced in the same method as the above Example 1-1 except that the mass ratio of polyamide-imide resin to polyetherimide resin was 100/10. Viscosity of the insulation film paint was 2730 mPa·s. Subsequently, the insulation film paint was applied on the outer periphery of a copper-wire conductor having an outer diameter of 0.8 mm and was baked by a general enamel coating method, thereby producing an insulated wire (Example 1-2) having a 0.044-mm thick insulation film.

Preparation of Example 1-3

An insulation film paint was produced in the same method as the above Example 1-1 except that the mass ratio of polyamide-imide resin to polyetherimide resin was 100/150. Viscosity of the insulation film paint was 700 mPa·s. Subsequently, the insulation film paint was applied on the outer periphery of a copper-wire conductor having an outer diameter of 0.8 mm by a general enamel coating method and then was baked, thereby producing an insulated wire (Example 1-3) having a 0.046-mm thick insulation film.

Preparation of Example 1-4

An insulation film paint was produced in the same method as the above Example 1-1 except that the mass ratio of polyamide-imide resin to polyetherimide resin was 100/5. Viscosity of the insulation film paint was 2850 mPa·s. Subsequently, the insulation film paint was applied on the outer periphery of a copper-wire conductor having an outer diameter of 0.8 mm and was baked by a general enamel coating method, thereby producing an insulated wire (Example 1-4) having a 0.045-mm thick insulation film.

Preparation of Comparative Example 1-1

An insulation film paint was produced in the same method as the above Example 1-1 except that the mass ratio of polyamide-imide resin to polyetherimide resin was 100/160. Viscosity of the insulation film paint was 680 mPa·s. Subsequently, the insulation film paint was applied on the outer periphery of a copper-wire conductor having an outer diameter of 0.8 mm and was baked by a general enamel coating method, thereby producing an insulated wire (Comparative example 1-1) having a 0.045-mm thick insulation film.

Preparation of Comparative Example 1-2

An insulation film paint was produced in the same method as the above Example 1-1 except that the mass ratio of polyamide-imide resin to polyetherimide resin was 100/0 (i.e., only polyamide-imide resin was used). Viscosity of the insulation film paint was 2960 mPa·s. Subsequently, the insulation film paint was applied on the outer periphery of a copper-wire conductor having an outer diameter of 0.8 mm and was baked by a general enamel coating method, thereby producing an insulated wire (Comparative example 1-2) having a 0.045-mm thick insulation film.

Preparation of Comparative Example 1-3

An insulation film paint was produced in the same method as the above Example 1-1 except that the mass ratio of polyamide-imide resin to polyetherimide resin was 0/100 (i.e., only polyetherimide resin was used). Viscosity of the insulation film paint was 680 mPa·s. Subsequently, the insulation film paint was applied on the outer periphery of a copper-wire conductor having an outer diameter of 0.8 mm and was baked by a general enamel coating method, thereby producing an insulated wire (Comparative example 1-3) having a 0.044-mm thick insulation film.

Preparation of Comparative Example 1-4

An insulation film paint was produced in the same method as the above Example 1-1 except that the mass ratio of polyamide-imide resin to polyetherimide resin was 301/100. Viscosity of the insulation film paint was 520 mPa·s. Subsequently, the insulation film paint was applied on the outer periphery of a copper-wire conductor having an outer diameter of 0.8 mm and was baked by a general enamel coating method, thereby producing an insulated wire (Comparative example 1-4) having a 0.044-mm thick insulation film.

(Synthesis of Polyamide-imide Resin A According to the Present Invention)

A diamine component of 451.1 g of 2,2-bis[4-(4-aminophenoxy)phenyl]propane and an acid component of 453.9 g of trimellitic anhydride are blended together in a reaction apparatus equipped with an agitator, reflux condenser tube, nitrogen inflow tube, and a thermometer. Next, a solvent of 2542.1 g of N-methyl-2-pyrolidone and an azeotropic solvent of 254.2 g of xylene were added. Then, the mixture was reacted for 4 hours at agitation revolutions of 180 rpm, at a nitrogen flow rate of 1 L/min, and at a system temperature of 180° C. (first-stage synthetic reaction process). Moreover, water and xylene generated during the dehydration ring closure reaction in the process were temporarily stored in the receiver and then drained from the system to the outside.

After the imide-group-containing dicarboxylic acid obtained in the first-stage synthetic reaction process had been cooled to 90° C., the imide-group-containing dicarboxylic acid was blended with a diisocyanate component of 319.7 g of 4,4'-diphenylmethane diisocyanate, and then the mixture was reacted for an hour at agitation revolutions of 150 rpm, at a nitrogen flow rate of 0.1 L/min, at a system temperature of 120° C. Subsequently, 89.3 g of benzyl alcohol and 635.4 g of N,N-dimethylformamide that are sealants are blended, and then the reaction was stopped (second-stage synthetic reaction process).

As the result of those synthetic reactions, polyamide-imide resin A (amorphous thermosetting resin) having a viscosity of 2000 mPa·s that was measured by an E-type viscometer was obtained.

Preparation of Example 2-1

An insulation film paint was produced in the same method as the above Example 1-1 except that polyamide-imide resin A, synthesized above, was used as a polyamide-imide resin. Viscosity of the insulation film paint was 860 mPa·s. Subsequently, the insulation film paint was applied on the Outer periphery of a copper-wire conductor having an outer diameter of 0.8 mm and was baked by a general enamel coating method, thereby producing an insulated wire (Example 2-1) having a 0.043-mm thick insulation film.

Example 2-2

An insulation film paint was produced in the same method as the above Example 1-1 except that the mass ratio of polyamide-imide resin A to polyetherimide resin was 100/10. Viscosity of the insulation film paint was 2520 mPa·s. Subsequently, the insulation film paint was applied on the outer periphery of a copper-wire conductor having an outer diameter of 0.8 mm and was baked by a general enamel coating method, thereby producing an insulated wire (Example 2-2) having a 0.043-mm thick insulation film.

Preparation of Example 2-3

An insulation film paint was produced in the same method as the above Example 1-1 except that the mass ratio of polyamide-imide resin A to polyetherimide resin was 100/150. Viscosity of the insulation film paint was 720 mPa·s. Subsequently, the insulation film paint was applied on the outer periphery of a copper-wire conductor having an outer diameter of 0.8 mm and was baked by a general enamel coating method, thereby producing an insulated wire (Example 2-3) having a 0.042-mm thick insulation film.

Preparation of Example 2-4

An insulation film paint was produced in the same method as the above Example 1-1 except that the mass ratio of polyamide-imide resin A to polyetherimide resin was 100/5. Viscosity of the insulation film paint was 2550 mPa·s. Subsequently, the insulation film paint was applied on the outer periphery of a copper-wire conductor having an outer diameter of 0.8 mm and was baked by a general enamel coating method, thereby producing an insulated wire (Example 2-4) having a 0.044-mm thick insulation film.

Preparation of Comparative Example 2-1

An insulation film paint was produced in the same method as the above Example 1-1 except that the mass ratio of polyamide-imide resin A to polyetherimide resin was 100/160. Viscosity of the insulation film paint was 700 mPa·s. Subsequently, the insulation film paint was applied on the outer periphery of a copper-wire conductor having an outer diameter of 0.8 mm and was baked by a general enamel coating method, thereby producing an insulated wire (Comparative example 2-1) having a 0.044-mm thick insulation film.

Preparation of Comparative Example 2-2

An insulation film paint was produced in the same method as the above Example 1-1 except that the mass ratio of polyamide-imide resin A to polyetherimide resin was 100/0 (i.e. only polyamide-imide resin A was used). Viscosity of the insulation film paint was 2740 mPa·s. Subsequently, the insulation film paint was applied on the outer periphery of a copper-wire conductor having an outer diameter of 0.8 mm and was baked by a general enamel coating method, thereby producing an insulated wire (Comparative example 2-2) having a 0.045-mm thick insulation film.

The following tests were conducted for the insulated wires (Examples 1-1 to 1-4, Comparative examples 1-1 to 1-4, Examples 2-1 to 2-4, and Comparative examples 2-1 to 2-2) produced as stated above. The surface of each insulation film was inspected by the use of a scanning electron microscope (S-3500N made by Hitachi, Ltd.), and the micro phase separation structure of each insulation film was evaluated. Furthermore, an average diameter of the island component of the sea-island structure was calculated by arbitrarily extracting 50 island components from photographed images and measuring the diameters thereof.

In the flexibility test for the insulated wires, evaluation was made by a self-diameter winding method. Moreover, the self-diameter winding method is a method in which an insulated wire is wound onto a rod (winding rod) having a diameter equivalent to the conductor diameter, and inspections for cracks on the insulation film are executed using an optical microscope. In this specification document, an insulated wire was wound five times per coil and the 5-coil worth length of insulated wire was inspected by an optical microscope of 50 magnifications. When no cracks were detected, the wire was considered “passed”.

The wear resistance test for the insulation film was a one-way wear test that was conducted by the following procedure. First, an insulated wire was cut into a 120-mm long wire, and insulation film on one terminal was peeled off by an abisofix apparatus, preparing an evaluation sample. A taper-type wear test machine (made by Toyo Seiki Co., Ltd.) was used for the wear resistance evaluation. An electrode was connected to the peeled terminal portion of each evaluation sample, and the wire sample was slid along a slanted surface while a load was applied perpendicularly to the surface of the insulation film, and when the wire was electrified, a load was measured and evaluated.

The twisting test was conducted by the following procedure. The insulated wire was linearly fixed to two clamps that are separated by a distance of 250 mm, one clamp was rotated, and when the insulation film was floated, the number of revolutions was measured.

The storage elasticity coefficient and Tg (glass transition temperature) of the insulation film were evaluated as follows. By the use of each insulation film paint, a strip-type, 25 μm (thickness)×5 mm×200 mm, evaluation film was made. While temperature was raised from room temperature to 400° C. at 10° C./min, the storage elasticity coefficient of the evaluation film at 100-Hz vibration was measured by a dynamic viscoelasticity measuring apparatus (DVA-200 made by IT Measurement Control Co., Ltd.). In this process, the temperature at the inflexion point at which the storage elasticity coefficient at a 100-Hz vibration decreases was specified as Tg.

Furthermore, the specific dielectric constant of the insulation film was measured as follows. In the same manner as stated above, a strip-type, 25 μm (thickness)×2 mm×100 mm, evaluation film was made. By the use of a cavity resonator perturbation method (cavity resonator perturbation method dielectric constant measuring apparatus made by Kantoh Electronics Application and Development Inc., and S parameter vector network analyzer 8720ES made by Agilent Technologies, Inc.), a specific dielectric constant (frequency: 10 GHz) of the evaluation film was measured.

The partial-discharge start voltage was measured by the following procedure. An insulated wire was cut into two 500-mm long wires, those two wires were twisted while a 14.7-N (1.5-kgf) tensile force was applied, and a twisted-pair wire sample having a 9-time twisting portion in the area of 120 mm at the central portion was made. Insulation film of a 10-mm length on an end of the wire sample was peeled by an abisofix apparatus. Subsequently, to dry the insulation film, the wire sample was kept in the 120° C. constant-temperature bath for 30 minutes and left in a desiccator for 18 hours until the temperature became room temperature. The partial-discharge start voltage was measured by a partial discharge automatic test system (DAC-6024 made by Soken Electric Co., Ltd.). Under the measurement condition of a 25° C.-atmosphere with a relative humidity of 50%, while 50-Hz voltage was increased at a rate of 10 to 30 V/s, the twisted-pair wire sample was electrified. The voltage at which a 50-pC electric discharge occurred in the twisted-pair wire sample 50 times was specified as a partial-discharge start voltage.

Measurement evaluation results of Examples 1-1 to 1-4 and Comparative examples 1-1 to 1-4 are shown in Table 1. And, measurement evaluation results of Examples 2-1 to 2-4 and Comparative examples 2-1 to 2-2 are shown in Table 2.

TABLE 1

Specifications and measurement evaluation results of insulated wires (Examples 1-1 to 1-4 and Comparative examples 1-1 to 1-4).

| Item | | | Example 1-1 | Example 1-2 | Example 1-3 | Example 1-4 |
|---|---|---|---|---|---|---|
| Characteristics of insulation film paint | Thermoplastic resin (parts by mass) | | 100 | 10 | 150 | 5 |
| | Thermosetting resin (parts by mass) | | 100 | 100 | 100 | 100 |
| | Appearance | | Brown | Brown | Brown | Brown |
| | Nonvolatile substance (mass %) | | 27 | 27 | 27 | 27 |
| | Viscosity (mPa · s) | | 820 | 2730 | 700 | 2850 |
| Characteristics of insulation film | Phase separation condition | | Sea-island structure | Sea-island structure | Sea-island structure | Sea-island structure |
| | Average particle diameter of island component (nm) | | 120 | 80 | 140 | 70 |
| Properties of insulated wire | Dimensions (mm) | Conductor diameter | 0.800 | 0.800 | 0.800 | 0.800 |
| | | Film thickness | 0.045 | 0.044 | 0.046 | 0.045 |
| | | Finished outer diameter | 0.890 | 0.889 | 0.891 | 0.890 |
| | Flexibility | Self-diameter winding | Passed | Passed | Passed | Passed |
| | Wear resistance | One-way wear (N) | 20.0 | 19.7 | 21.1 | 18.5 |
| | Twisting test (Number of times) | | 132 | 136 | 136 | 135 |
| | Tg (° C.) | | 286 | 285 | 284 | 286 |
| | Storage elasticity coefficient | At 25° C. (GPa) | 1.8 | 1.9 | 1.6 | 1.8 |
| | | At 300° C. (MPa) | 300 | 960 | 220 | 980 |
| | Partial-discharge start voltage (Vp) | At 25° C., 50% RH, 50 Hz, 50 pC by 50 times | 980 | 972 | 985 | 920 |

TABLE 1-continued

Specifications and measurement evaluation results of insulated wires (Examples 1-1 to 1-4 and Comparative examples 1-1 to 1-4).

| | | | | | | |
|---|---|---|---|---|---|---|
| | Specific dielectric constant | At 10 GHz | 3.7 | 4.2 | 3.5 | 4.2 |

| Item | | | Comparative example 1-1 | Comparative example 1-2 | Comparative example 1-3 | Comparative example 1-4 |
|---|---|---|---|---|---|---|
| Characteristics of insulation film paint | Thermoplastic resin (parts by mass) | | 160 | 0 | 100 | 301 |
| | Thermosetting resin (parts by mass) | | 100 | 100 | 0 | 100 |
| | Appearance | | Brown | Brown | Brown | Brown |
| | Nonvolatile substance (mass %) | | 27 | 29 | 25 | 25 |
| | Viscosity (mPa · s) | | 680 | 2960 | 680 | 520 |
| Characteristics of insulation film | Phase separation condition | | co-continuous structure | No phase separation | No phase separation | Sea-island structure |
| | Average particle diameter of island component (nm) | | — | 0 | 0 | 70 |
| Properties of insulated wire | Dimensions (mm) | Conductor diameter | 0.800 | 0.800 | 0.800 | 0.800 |
| | | Film thickness | 0.045 | 0.045 | 0.044 | 0.044 |
| | | Finished outer diameter | 0.890 | 0.890 | 0.889 | 0.889 |
| | Flexibility | Self-diameter winding | Passed | Passed | Passed | Passed |
| | Wear resistance | One-way wear (N) | 17.5 | 18.4 | 17.5 | 17.1 |
| | Twisting test (Number of times) | | 135 | 132 | 135 | 132 |
| | Tg (° C.) | | 242 | 286 | 240 | 248 |
| | Storage elasticity coefficient | At 25° C. (GPa) | 1.6 | 1.8 | 1.4 | 1.2 |
| | | At 300° C. (MPa) | <10 | 1100 | <10 | <10 |
| | Partial-discharge start voltage (Vp) | At 25° C., 50% RH, 50 Hz, 50 pC by 50 times | 985 | 815 | 980 | 950 |
| | Specific dielectric constant | At 10 GHz | 3.5 | 4.3 | 3.1 | 3.3 |

TABLE 2

Specifications and measurement evaluation results of insulated wires (Examples 2-1 to 2-4 and Comparative examples 2-1 and 2-2).

| Item | | Example 2-1 | Example 2-2 | Example 2-3 | Example 2-4 |
|---|---|---|---|---|---|
| Characteristics of insulation film paint | Thermoplastic resin (parts by mass) | 100 | 10 | 150 | 5 |
| | Thermosetting resin A (parts by mass) | 100 | 100 | 100 | 100 |
| | Appearance | Brown | Brown | Brown | Brown |
| | Nonvolatile substance (mass %) | 27 | 27 | 27 | 27 |
| | Viscosity (mPa · s) | 860 | 2520 | 720 | 2550 |
| Characteristics of insulation film | Phase separation condition | Sea-island structure | Sea-island structure | Sea-island structure | sea-island structure |
| | Average particle diameter of island component (nm) | 120 | 90 | 140 | 90 |

TABLE 2-continued

Specifications and measurement evaluation results of insulated wires (Examples 2-1 to 2-4 and Comparative examples 2-1 and 2-2).

| | | | | | | |
|---|---|---|---|---|---|---|
| Properties of insulated wire | Dimensions (mm) | Conductor diameter | 0.800 | 0.800 | 0.800 | 0.800 |
| | | Film thickness | 0.043 | 0.043 | 0.042 | 0.044 |
| | | Finished outer diameter | 0.886 | 0.886 | 0.884 | 0.888 |
| | Flexibility | Self-diameter winding | Passed | Passed | Passed | Passed |
| | Wear resistance | One-way wear (N) | 20.2 | 19.5 | 21.0 | 20.0 |
| | Tg (° C.) | | 246 | 245 | 244 | 246 |
| | Partial-discharge start voltage (Vp) | At 25° C., 50% RH, 50 Hz, 50 pC by 50 times | 1050 | 1020 | 1040 | 1005 |
| | Specific dielectric constant | At 10 GHz | 2.8 | 2.9 | 2.8 | 2.9 |

| | Item | | Comparative example 2-1 | Comparative example 2-2 |
|---|---|---|---|---|
| Characteristics of insulation film paint | Thermoplastic resin (parts by mass) | | 160 | 0 |
| | Thermosetting resin A (parts by mass) | | 100 | 100 |
| | Appearance | | Brown | Brown |
| | Nonvolatile substance (mass %) | | 27 | 29 |
| | Viscosity (mPa · s) | | 700 | 2740 |
| Characteristics of insulation film | Phase separation condition | | Co-continuous structure | No phase separation |
| | Average particle diameter of island component (nm) | | — | 0 |
| Properties of insulated wire | Dimensions (mm) | Conductor diameter | 0.800 | 0.800 |
| | | Film thickness | 0.044 | 0.045 |
| | | Finished outer diameter | 0.888 | 0.890 |
| | Flexibility | Self-diameter winding | Passed | Passed |
| | Wear resistance | One-way wear (N) | 17.0 | 18.5 |
| | Tg (° C.) | | 202 | 246 |
| | Partial-discharge start voltage (Vp) | At 25° C., 50% RH, 50 Hz, 50 pC by 50 times | 985 | 970 |
| | Specific dielectric constant | At 10 GHz | 2.9 | 3.8 |

Table 1 indicates that insulated wires according to the present invention (Examples 1-1 to 1-4) have a high-level of balance among the mechanical characteristics (wear resistance test result), heat resistance (storage elasticity coefficient at 300° C.), and partial-discharge start voltage characteristics. On the contrary, insulated wires (Comparative examples 1-1 to 1-4) that are beyond the specifications prescribed by the present invention do not satisfy all of the required characteristics; some characteristics were inferior.

Furthermore, Table 2 indicates that insulated wires according to the present invention (Examples 2-1 to 2-4) have a partial-discharge start voltage of 1000 Vp or more without increasing the thickness of the insulation film (with a thickness up to approximately 45 μm) formed on the conductor. That is, according to the present invention, it is possible to provided an insulated wire having a high partial-discharge start voltage while thickness of the insulation film thereof is equivalent to that of the conventional insulation film. Furthermore, besides the partial-discharge start voltage, it is indicated that the insulated wires according to the present invention (Examples 2-1 to 2-4) have well-balanced mechanical characteristics (flexibility test result and wear resistance test result). Based on the fact, the insulated wires according to the present invention are considered to have sufficient resistance (mechanical characteristics) against the winding process and the rolling process. On the contrary, in the insulated wires (Comparative examples 2-1 and 2-2) which are beyond the specifications prescribed by the present invention, it is indicated that the thickness of the insulation film is approximately 45 μm and a partial-discharge start voltage of 1000 Vp or more cannot be obtained. That is, according to the insulated wires (Comparative examples 2-1 and 2-2) that are beyond the specifications prescribed by the present invention, it was not possible to obtain a higher partial-discharge start voltage while the thickness of the insulation film was equivalent to the conventional one.

As described above, an insulated wire according to the present invention is equipped with an insulation film made of polymer alloy which comprises an amorphous thermosetting resin and an amorphous thermoplastic resin, wherein: an insulation film having a sea-island structure is formed; the thermosetting resin is a sea component of the sea-island structure; and the thermoplastic resin is an island component of the sea-island structure. Because of this feature, it was verified that it is possible to obtain an insulated wire having mechanical characteristics and heat resistance equivalent to or better than the conventional insulation film and also having a higher partial-discharge start voltage. Furthermore, by use of a polyamide-imide resin having a repeat unit indicated by the aforementioned chemical formula 1 for the amorphous thermosetting resin, it was verified that it is possible to obtain an insulated wire having a higher partial-discharge start voltage while having a thickness of the insulation film equivalent to the conventional insulation film.

Although the present invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An insulated wire comprising a conductor and an insulation film made of polymer alloy around the conductor, wherein:

the polymer alloy consists essentially of an amorphous thermosetting resin and an amorphous thermoplastic resin;

the insulation film has a single-layered structure and a sea-island structure and is formed directly on the conductor;

the amorphous thermosetting resin is a polyamide-imide resin and is a sea component of the sea-island structure, the sea component is a continuous phase, and the amorphous thermosetting resin has an average molecular mass of 10,000 to 200,000; and the amorphous thermoplastic resin is a polyetherimide resin and is an island component of the sea-island structure, the island component is a dispersed phase, the amorphous thermoplastic resin has an average molecular mass of 15,000 to 200,000, and the island component has an average diameter of less than 1 μm.

2. The insulated wire according to claim 1, wherein the polymer alloy contains 10 parts by mass to 150 parts by mass of the amorphous thermoplastic resin with regard to 100 parts by mass of the amorphous thermosetting resin.

3. The insulated wire according to claim 2, wherein the insulation film has a thickness of 1 μm to 200 μm.

4. An insulated wire comprising a conductor and an insulation film made of polymer alloy around the conductor, wherein:

the polymer alloy consists essentially of an amorphous thermoplastic resin and an amorphous thermosetting resin;

the insulation film is a single-layered structure and a sea-island structure and is formed directly on the conductor;

the amorphous thermosetting resin is a polyamide-imide resin having a repeat unit indicated by chemical formula 1, described below, and is a sea component of the sea-island structure, the sea component is a continuous phase, and the amorphous thermosetting resin has an average molecular mass of 10,000 to 200,000; and the amorphous thermoplastic resin is a polyetherimide resin and is an island component of the sea-island structure, the island component is a dispersed phase, the amorphous thermoplastic resin has an average molecular mass of 15,000 to 200,000, and the island component has an average diameter of less than 1 μm,

[Chemical formula 1]

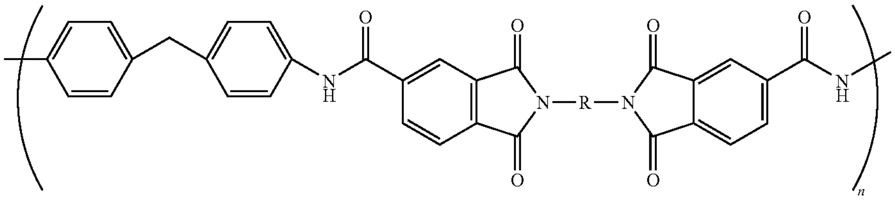

wherein in chemical formula 1, R denotes aromatic diamines having a bivalent aromatic group having three or more aromatic rings, and n denotes the number of repetitions and is a positive integer.

5. The insulated wire according to claim 4, wherein the polyamide-imide resin having a repeat unit indicated by the chemical formula 1 is a polyamide-imide resin obtained by reacting imide-group-containing dicarboxylic acid, which is created by synthetically reacting a diamine component composed of aromatic diamines having a bivalent aromatic group having three or more aromatic rings with an acid component in an azeotropic solvent, with a diisocyanate component composed of aromatic diisocyanates.

6. The insulated wire according to claim 4, wherein the polymer alloy contains 10 to 150 parts by mass of the amorphous thermoplastic resin with regard to 100 parts by mass of the polyamide-imide resin having a repeat unit indicated by the chemical formula 1.

7. The insulated wire according to claim 4, wherein the insulation film has a thickness of 1 μm to 45 μm.

8. An insulated wire comprising:

a conductor and an insulation film made of polymer alloy, the insulation film being disposed directly on the conductor, the polymer alloy comprising a polyamide-imide resin as an amorphous thermosetting resin and a polyetherimide resin as an amorphous thermoplastic resin;

wherein:

the insulation film has a single-layered structure and a micro phase separation structure;

the polyamide-imide resin forms a continuous phase of the micro phase separation structure, the amorphous thermosetting resin has an average molecular mass of 10,000 to 200,000; and the polyetherimide resin forms a dispersed phase of islands of the micro phase separation structure, the amorphous thermoplastic resin has an average molecular mass of 15,000 to 200,000, and the islands component has an average diameter of less than 1 μm.

9. The insulated wire according to claim 8, wherein the polymer alloy contains 10 parts by mass to 150 parts by mass of the amorphous thermoplastic resin with regard to 100 parts by mass of the amorphous thermosetting resin.

10. The insulated wire according to claim 8, wherein the insulation film has a thickness of 1 μm to 200 μm.

* * * * *